United States Patent [19]
Gharsalli et al.

[11] Patent Number: 6,062,317
[45] Date of Patent: May 16, 2000

[54] METHOD AND APPARATUS FOR CONTROLLING THE DIRECTION OF TRAVEL OF AN EARTHWORKING MACHINE

[75] Inventors: Imed Gharsalli, Peoria; Frank J. Lombardi, Metamora, both of Ill.

[73] Assignee: Caterpillar Inc., Peoria, Ill.

[21] Appl. No.: 09/389,709

[22] Filed: Sep. 3, 1999

[51] Int. Cl.$^7$ ............................................... E02F 3/76
[52] U.S. Cl. .................................... 172/2; 701/50
[58] Field of Search ........................ 172/2, 3, 4, 4.5; 701/50

[56] References Cited

U.S. PATENT DOCUMENTS

| | | | |
|---|---|---|---|
| 5,462,122 | 10/1995 | Yamamoto et al. | 172/2 |
| 5,487,428 | 1/1996 | Yamamoto et al. | 172/4.5 |
| 5,503,232 | 4/1996 | Matsushita et al. | 172/2 |
| 5,515,927 | 5/1996 | Matsushita et al. | 172/3 |
| 5,564,507 | 10/1996 | Matsushita et al. | 172/3 |
| 5,875,854 | 3/1999 | Yamamoto et al. | 172/4.5 |

Primary Examiner—Christopher J. Novosad
Attorney, Agent, or Firm—Steven D. Lundquist

[57] ABSTRACT

A method and apparatus for controlling a direction of travel of an earthworking machine having an earthworking implement. The method and apparatus includes determining a desired heading of the machine, determining an actual heading of the machine, determining a straight line path for the machine as a function of the desired heading, determining a deviation of the actual heading from the desired heading, determining a desired tilt angle of the implement as a function of the deviation, and controlling the tilt angle of the implement to the desired tilt angle and responsively steering the machine on the straight line path.

21 Claims, 6 Drawing Sheets

METHOD AND APPARATUS FOR CONTROLLING THE DIRECTION OF TRAVEL OF AN EARTHWORKING MACHINE

TECHNICAL FIELD

This invention relates generally to a method and apparatus for controlling the direction of travel of an earthworking machine and, more particularly, to a method and apparatus for maintaining the movement of the earthworking machine in a desired straight line direction.

BACKGROUND ART

Earthworking machines, such as track-type tractors, are used to push and carry material over a distance as part of a material removal or shaping process. Generally, it is desired to move the earthworking machine in a relatively straight line from a start position to a desired end position. However, unequal forces exerted on the blade of the machine are caused by characteristics of the material being pushed, such as large rocks and different material types, e.g., clay, sand, and the like. These unequal forces tend to push the machine in directions other than the desired straight line, and cause the earthworking machine to deviate from the desired direction of travel. In addition, slippage of one of the tracks of the earthworking machine may cause the machine to deviate from the desired direction of travel.

In U.S. Pat. No. 5,487,428, Yamamoto et al. disclose a system which tilts the blade of a bulldozer in a manner to control steering of the bulldozer in response to determining that the yaw of the bulldozer has changed due to the bulldozer being forced off of its desired straight line of travel. However, the yaw of the machine does not indicate the desired direction of travel, and therefore the operator is responsible for determining a new desired straight line after steering compensation is made. The responsibility of ensuring that the bulldozer continues to travel the desired straight line path is left to the operator of the machine. In addition, by the time that yaw is detected, the machine may have moved a significant amount from the desired course. It would be desirable to maintain the desired straight line path of the machine in a more quickly responsive manner, and without the need for active operator intervention.

Much work has progressed toward making various functions of earthworking machines autonomous or semi-autonomous. For example, in U.S. Pat. No. 5,560,431, Stratton discloses a system which controls the depth of the blade of an earthworking machine in the material being moved to optimize the work being performed by the machine. Parameters such as ground speed, track slip, slope, angular rate, and tip position of the blade are monitored and the optimal height of the blade is then determined and attained. The invention disclosed by Stratton relieves an operator of the responsibility for continually raising and lowering the blade to achieve what is believed to be optimum machine performance. However, the operator would still have to monitor the straight line desired path of travel of the machine and make continual steering adjustments as the machine pushed material to a desired end location. A system which would make straight line steering of the machine an autonomous function, and which could work in cooperation with a blade load optimizing system such as the one disclosed by Stratton, would be a desirable addition toward an efficient autonomous or semi-autonomous earthworking machine.

The present invention is directed to overcoming one or more of the problems as set forth above.

DISCLOSURE OF THE INVENTION

In one aspect of the present invention a method for controlling a direction of travel of an earthworking machine having an earthworking implement is disclosed. The method includes the steps of determining a desired heading of the machine, determining an actual heading of the machine, determining a straight line path for the machine as a function of the desired heading, determining a deviation of the actual heading from the desired heading, determining a desired tilt angle of the implement as a function of the deviation, and controlling the tilt angle of the implement to the desired tilt angle and responsively steering the machine on the straight line path.

In another aspect of the present invention an apparatus for controlling a direction of travel of an earthworking machine having an earthworking implement is disclosed. The apparatus includes a machine position determining system, and a heading controller for receiving machine position information, determining a straight line path for the machine as a function of the machine position information, determining a deviation of an actual heading of the machine from a desired heading, and determining a desired tilt angle of the implement as a function of the deviation. The apparatus also includes a tilt controller for receiving the desired tilt angle from the heading controller and responsively controlling the tilt angle of the implement to the desired tilt angle.

In yet another aspect of the present invention an apparatus for controlling a direction of travel of an earthworking machine having an earthworking implement is disclosed. The apparatus includes means for determining a desired heading of the machine, means for determining an actual heading of the machine, means for determining a straight line path for the machine as a function of the desired heading, means for determining a deviation of the actual heading from the desired heading, means for determining a desired tilt angle of the implement as a function of the deviation, and means for controlling the tilt angle of the implement to the desired tilt angle and responsively steering the machine on the straight line path.

BEST MODE FOR CARRYING OUT THE INVENTION

With reference to the drawings, the claims, and the specification, the present invention is a method and apparatus 100 for controlling a direction of travel of an earthworking machine 102 having an earthworking implement 104.

Figure 1:
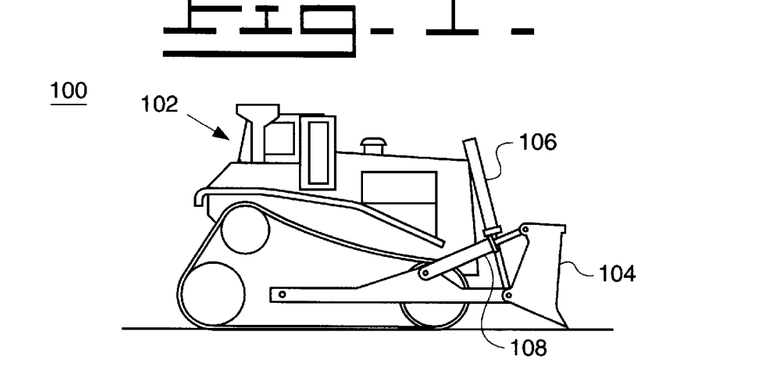
FIG. 1 is a diagrammatic illustration of an earthworking machine suited for use with the present invention.

Referring particularly to FIG. 1, an earthworking machine 102 is shown as a track-type tractor. The track-type tractor has an earthworking implement 104 in the form of an earth digging and carrying blade. Track-type tractors having blades are commonly used to dig and push material from a start position to an end position.

It is noted, however, that other types of earthworking machines 102 having similar or other types of earthworking implements 104 may be used with the present invention. For example, a motor grader having a blade, a loader having a bucket, and an agricultural machine having an agricultural implement may be used with the present invention.

Typically, the earthworking machine 102 controls the position of the earthworking implement 104 relative to the machine 102 and the material being worked. For example, the machine 102 of FIG. 1 controls the position of the implement 104 by the use of hydraulic cylinders. FIG. 1 illustrates an implement lift cylinder 106 used to raise and lower the implement 104. Typically, a machine 102 of the type shown in FIG. 1 will have more then one lift cylinder 106, e.g., two lift cylinders 106 located at spaced apart positions toward the left and right ends of the implement 104. An implement tilt cylinder 108 is used to tilt the earthworking implement 104. Typically, a machine 102 of the types shown in FIG. 1 will have more than one tilt cylinder 108, e.g., two tilt cylinders 108 located at spaced apart positions toward the left and right ends of the implement 104. The implement lift cylinders 106 are configured to lift the implement 104, and the implement tilt cylinders 108 are configured to tilt either the left or right end of the implement 104, i.e., raise and lower one end of the implement 104 relative to the other end of the implement 104.

The cylinder configuration shown in FIG. 1 is one possible configuration which may be used with the present invention. Other types of implement control arrangements may be used without deviating from the spirit of the invention.

Figure 2:
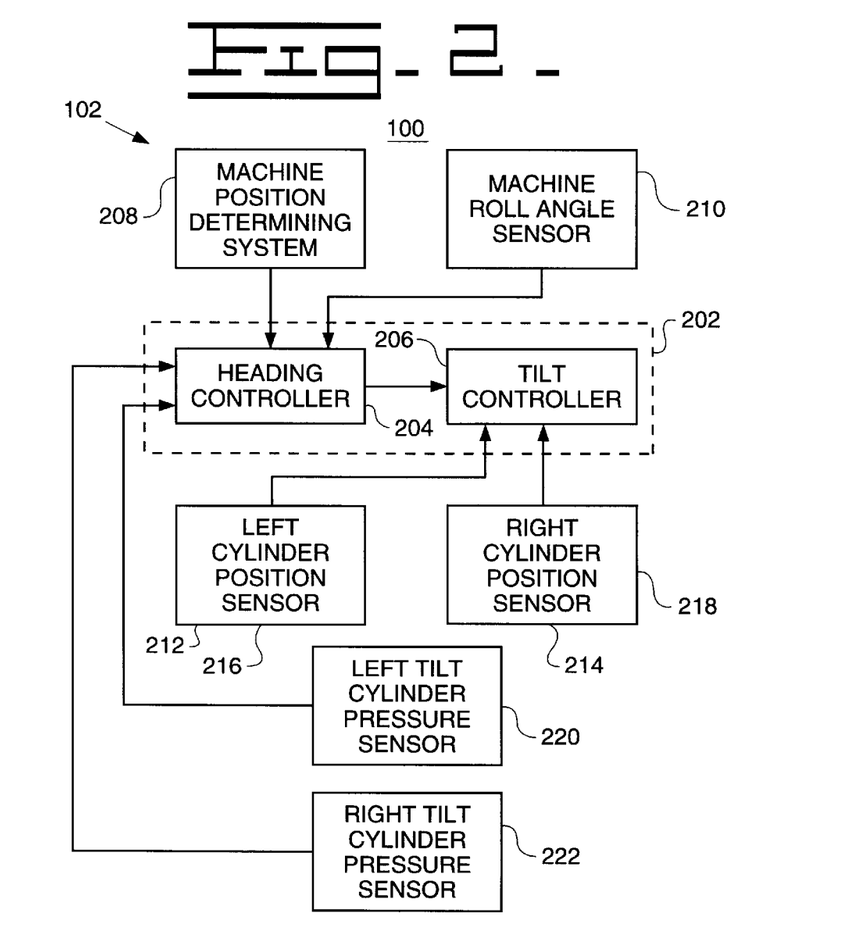
FIG. 2 is a block diagram illustrating an embodiment of the present invention.

Referring now to FIG. 2, a block diagram illustrating a preferred embodiment of the present invention is shown. A control system 202, located on the machine 102, is adapted to control the operations of the machine 102 relevant to the invention. The control system 202 is shown as having a heading controller 204 and a tilt controller 206. In one embodiment, the heading controller 204 and the tilt controller 206 are separate controllers in communication with each other. However, it may be appreciated that the heading controller 204 and the tilt controller 206 may be part of one controller adapted to perform the separate tasks of the heading controller 204 and tilt controller 206.

A machine position determining system 208, located on the machine 102, is adapted to determine the position and the heading of the machine 102 in site coordinates. Preferably, the machine position determining system 208 is a global position satellite (GPS) system. However, other types of position determining systems, e.g., laser plane, dead reckoning, and combinations of systems, may be used as well. The use of position determining systems is well known in the art, and will not be discussed further.

A machine roll angle sensor 210, i.e., a sensor for determining the roll angle of the machine 102 with respect to a horizontal reference plane, may optionally be used with the present invention. The use of the machine roll angle sensor 210 is discussed in more detail below.

With reference to the exemplary implement cylinder arrangement of FIG. 1, left and right cylinder position sensors are shown in FIG. 2. In one embodiment, left and right lift cylinder position sensors 212,214 are used to determine the position of the implement lift cylinders 106.

In another embodiment, left and right tilt cylinder position sensors 216,218 are used to determine the position of the implement tilt cylinders 108.

The left and right cylinder position sensors may be any of a variety of types including, but not limited to, electromagnetic, radio-frequency, infra-red, resolvers, sliding potentiometers, and the like.

In an alternate embodiment of the present invention, discussed in more detail below, a left tilt cylinder pressure sensor 220 and a right tilt cylinder pressure sensor 222 may be used. The left and right tilt cylinder pressure sensors 220,222 may be any of a variety of types suitable for determining the force exerted on the tilt cylinders 108 including, but not limited to, strain gauges, hydraulic pressure sensors, and the like.

Figure 3:
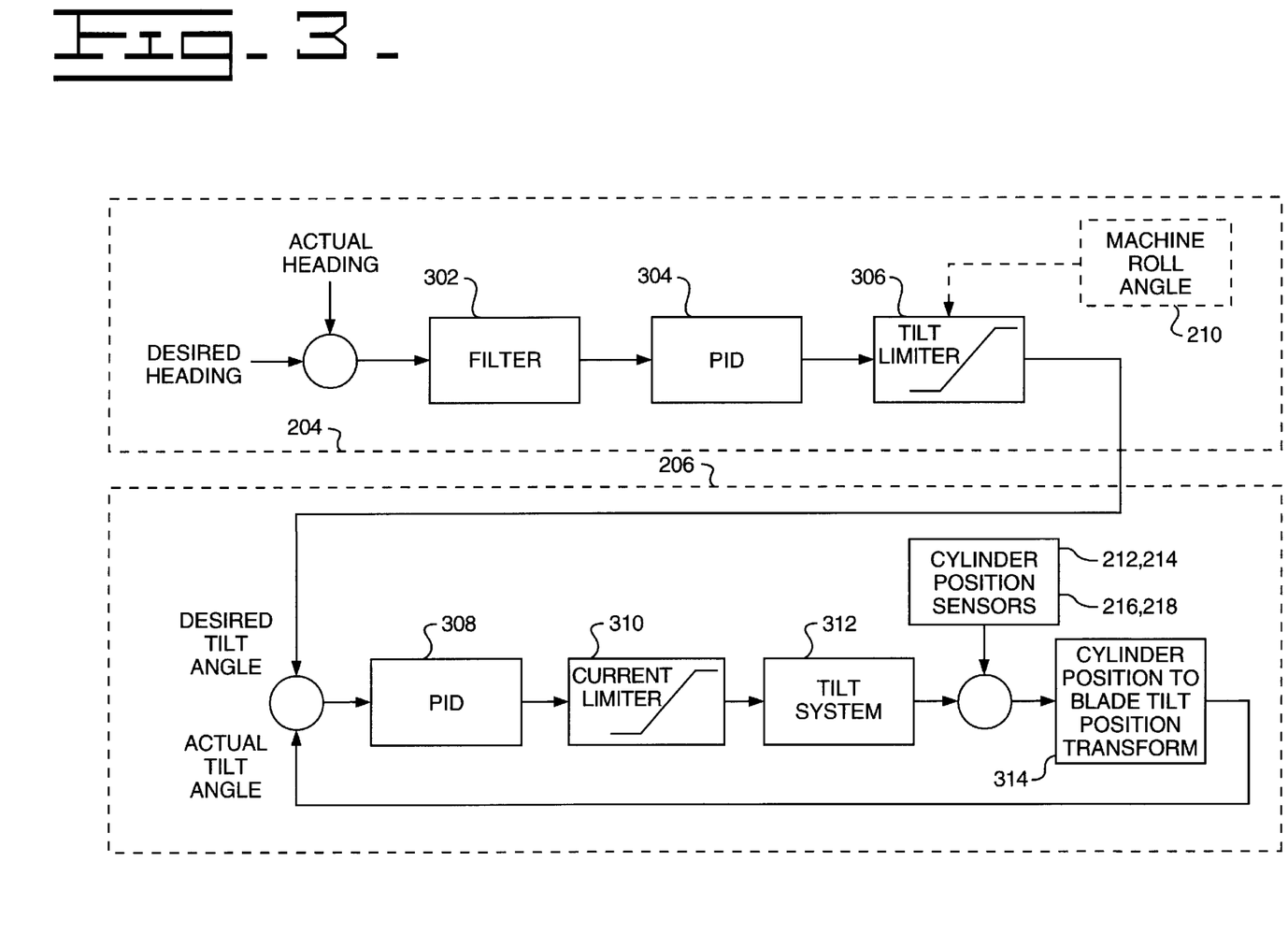
FIG. 3 is a control loop diagram illustrating an embodiment of the present invention.

Referring now to FIG. 3, a control loop diagram is shown which illustrates a preferred embodiment of the present invention. Two control loops are shown. The first control loop depicts the control operations of the heading controller 204. Command signals from this first control loop are delivered to a second control loop, which depicts the control operations of the tilt controller 206.

A desired heading and an actual heading are input to the heading controller 204. Preferably, the desired heading is determined by the operator at the start of travel of the machine 102. Alternatively, the desired heading may be determined by remote control or by an autonomous system which is given instructions to perform certain tasks and then responsively determine the desired heading needed to perform the work.

In the preferred embodiment, the actual heading is determined by the machine position determining system 208 on a periodic or continual basis.

An error signal between the desired and actual headings is delivered to a filter 302, which is adapted to filter out undesirable noise elements from the actual heading signal. For example, transients and noise from the machine position determining system 208 may need to be filtered to maintain an accurate error signal.

The filtered error signal is then delivered to the heading controller 204. In one embodiment, the heading controller 204 uses a PID network 304 in the control loop. An advantage of using a PID network 304 is that the allowable heading error may be adjusted by varying the proportional gain of the PID network 304. A smaller allowable heading error permits greater control of the earthworking machine 102 in situations which require greater control. However, if less control is needed, a larger allowable heading error may be permitted which reduces the amount of control effort needed by the heading controller 204.

In an alternate embodiment, the PID network 304 may be replaced by a fuzzy logic network (not shown). The fuzzy logic network offers the same results as the PID network, but with less control effort. However, tuning of the fuzzy logic network to adjust the allowable heading error is more difficult to achieve.

Other types of control networks may be used in place of the PID network 304 without deviating from the spirit of the present invention. It is noted that PID and fuzzy logic control networks are well known in the art, and therefore need not be discussed further.

A tilt limiter 306 may be used to establish constraints on the amount of allowable tilt of the implement 104. For example, it may be desired to limit the tilt of a track-type tractor blade to no more than +/−4.5 degrees to prevent undesirable loading on the blade.

Optionally, a machine roll angle sensor 210 may be used to determine an angle of roll of the earthworking machine 102, e.g., the machine 102 may be on a sloped surface. The roll angle of the machine 102 may then be used to apply further constraints on the allowable amount of tilt of the implement 104. For example, if the machine 102 is on a sloped surface, it may be desirable to reduce the amount of blade tilt allowed to prevent the machine 102 from turning excessively on the sloped surface.

The heading controller 204 is adapted to provide a desired tilt angle command signal. The desired tilt angle signal is delivered to the tilt controller 206 and is compared with the actual tilt angle of the implement 104.

The difference between the desired tilt angle and the actual tilt angle, i.e., a tilt angle error signal, is delivered to a control network of the tilt controller 206, preferably a PID network 308. However, other types of control networks, e.g., fuzzy logic, and the like, may be used as well.

The output signal from the tilt controller PID network 308 is delivered to a tilt system 312, preferably through a current limiter 310. The current limiter prevents excessive currents from being applied to the electro-hydraulics of the hydraulic tilt system. For example, the current limiter 310 may only allow a current not to exceed +/−1 amp to be delivered to the tilt system 312.

The tilt system 312 includes the hydraulics and electro-hydraulics necessary to control movement of the earthworking implement 104. More specifically, the tilt system 312 is adapted to control the operation of the implement lift cylinders 106 and the implement tilt cylinders 108, which in turn control the movement of the implement 104.

The left and right lift cylinder position sensors 212,214, and, alternatively, the left and right tilt cylinder position sensors 216,218 are monitored to determine the amount of movement of the cylinders of interest. In the preferred embodiment, the left and right lift cylinders 106 are sensed. Typically, the lift cylinders 106 already incorporate sensors 212,214 using, for example, electro-magnetic sensor technology, for other purposes. Therefore, the sensors 212, 214 may already exist on the machine 102, thus saving the costs of adding more sensors. In addition, the types of sensors typically used for the implement lift cylinders 106 are relatively immune from noise interference, and are more reliable and trouble free than sensors which might be added to the machine 102 for the implement tilt cylinders 108.

A transform 314 used to transform the cylinder positions to blade tilt position information is used to determine the position of the implement 104 as a function of the cylinder positions. The blade tilt position information is delivered back to the input of the tilt controller 206 to compare with the desired tilt angle.

Figure 4:
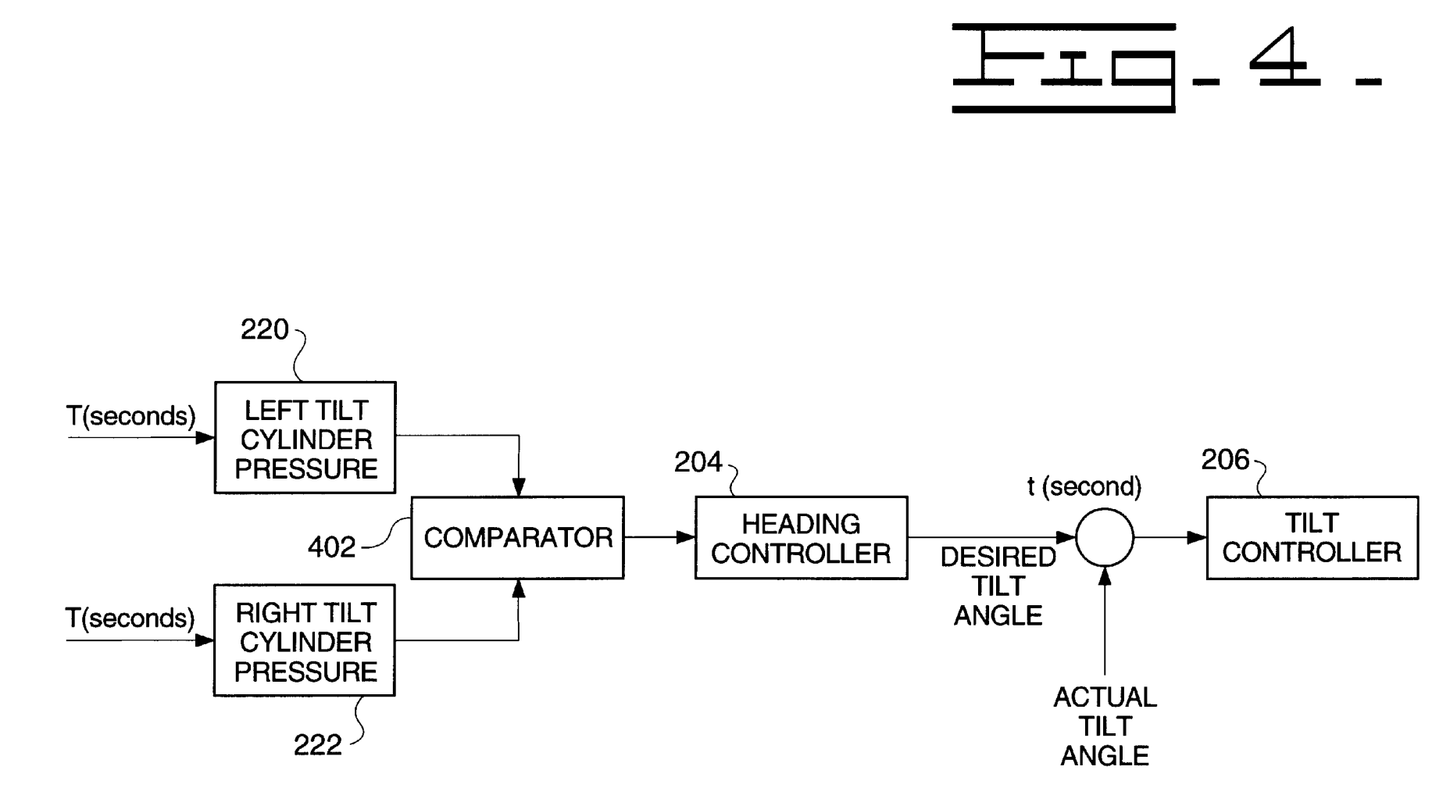
FIG. 4 is a control loop diagram illustrating another embodiment of the present invention.

Referring now to FIG. 4, an alternate embodiment of the present invention is depicted in a control diagram. This embodiment might, for example, be employed during brief periods of time when the machine position determining system 208 is not able to determine the actual heading of the machine 102, for example during periods when not enough GPS satellites are available. Alternatively, the alternate embodiment may be used to enhance and reinforce the control system based on heading information.

At an interval of every T seconds, the left and right cylinder pressure 220,222 is determined. These pressures might be determined, for example, by sensing the force exerted on the left and right tilt cylinders 108, e.g., by using sensors such as strain gauges, hydraulic pressure sensors, and the like.

The left and right cylinder pressures 220,222 are compared with each other by a comparator 402 to determine a difference in forces, which would indicate that the machine 102 is deviating from a straight line path. The difference signal is delivered to the heading controller 204, and the implement tilt angle is controlled by the control systems described with respect to FIG. 3.

The desired tilt angle command signal is delivered to the tilt controller 206 over a span of t seconds, which is chosen to be a time interval smaller than the T seconds used for determining the cylinder pressures. This allows for any transients in the pressure determinations to smooth out to steady state values, and therefore, allows for more accurate control of the tilt angle of the implement 104. For example, the time interval t may be approximately one half of the time interval T.

Figure 5:
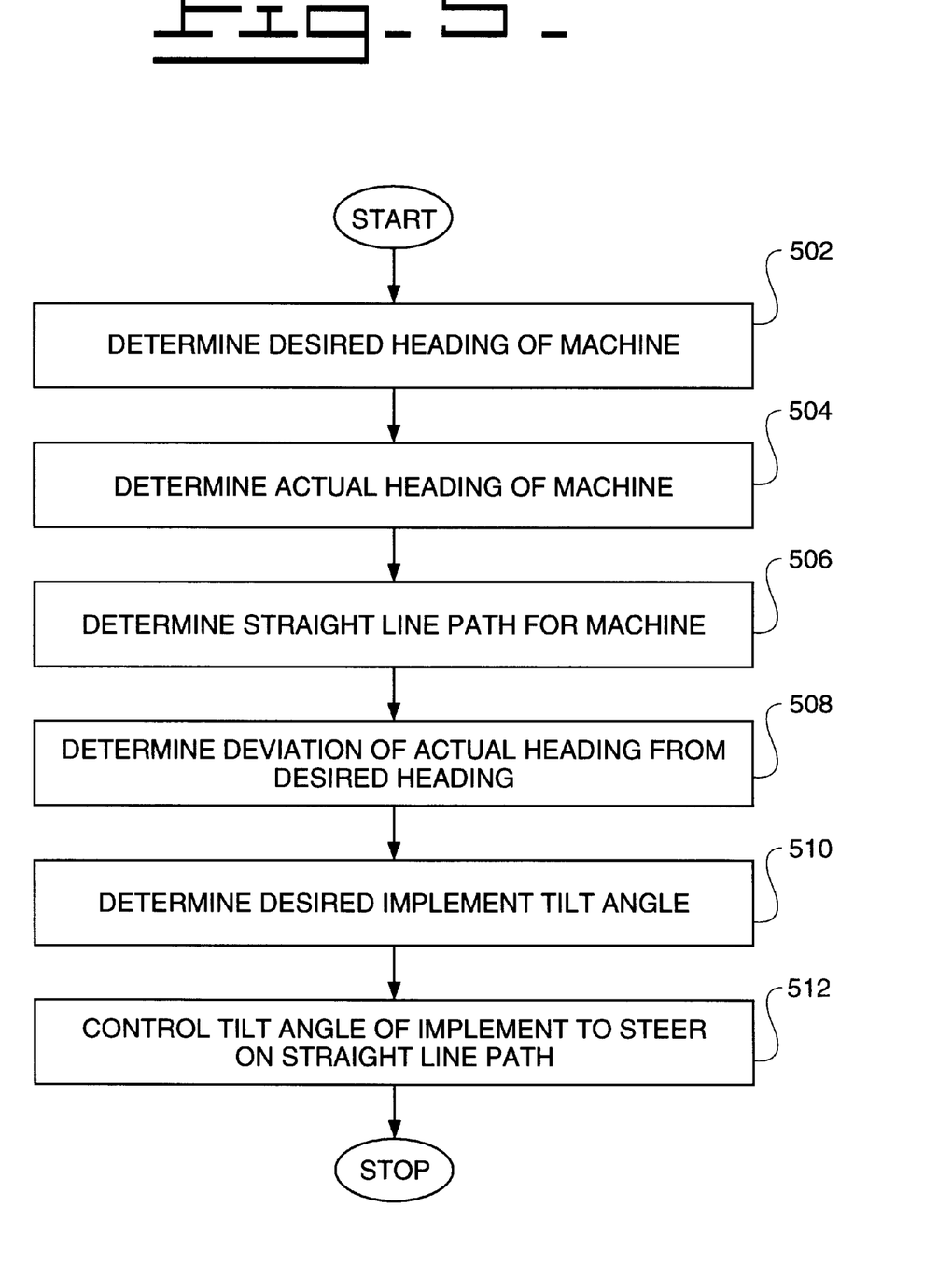
FIG. 5 is a flow diagram illustrating an aspect of the present invention.

Referring now to FIG. 5, a flow diagram illustrating a preferred method of the present invention is shown.

In a first control block 502, the desired heading of the earthworking machine 102 is determined. The desired heading may be determined by an operator on board the machine 102, may be determined by remote control, or may be determined autonomously using means known in the art.

In a second control block 504, the actual heading of the machine 102 is determined preferably the actual heading is determined using a machine position determining system, such as GPS. However, the actual heading may, in the alternative, be determined by comparing force differences between the left and the right tilt cylinders 108, as discussed above.

Control then proceeds to a third control block 506, where a straight line path for the earthworking machine 102 is determined. In the example being used of a track-type tractor having a blade for digging and carrying earth, it is normally desired to dig into the earth, then switch to a carry mode where the earth is pushed by the blade to an end location, usually a straight line distance from the start position.

In a fourth control block 508, the actual heading of the machine 102 is compared to the desired heading, and any deviations are determined. A deviation from the desired heading is defined as when the machine 102 begins to deviate from the previously determined straight line path. Deviations might occur, for example, if the implement 104 encounters unequal forces, such as might take place if the implement 104 encounters a large rock. In addition, the machine 102 might deviate from the desired heading if either a left or a right track of the machine 102 begins to slip due to differences in characteristics of the earth, such as wet or sandy areas, and the like.

In a fifth control block 510, the heading controller 204 determines a desired implement tilt angle which would correct the steering of the machine 102 to compensate for any deviations from the desired heading.

Control then proceeds to a sixth control block 512, where the tilt angle of the implement 104 is controlled to enable the machine 102 to be steered back onto the desired straight line path. Preferably, the tilt controller 206 provides the control needed for the lift and tilt cylinders 106,108 to responsively control the tilt angle of the implement 104.

Figure 6:
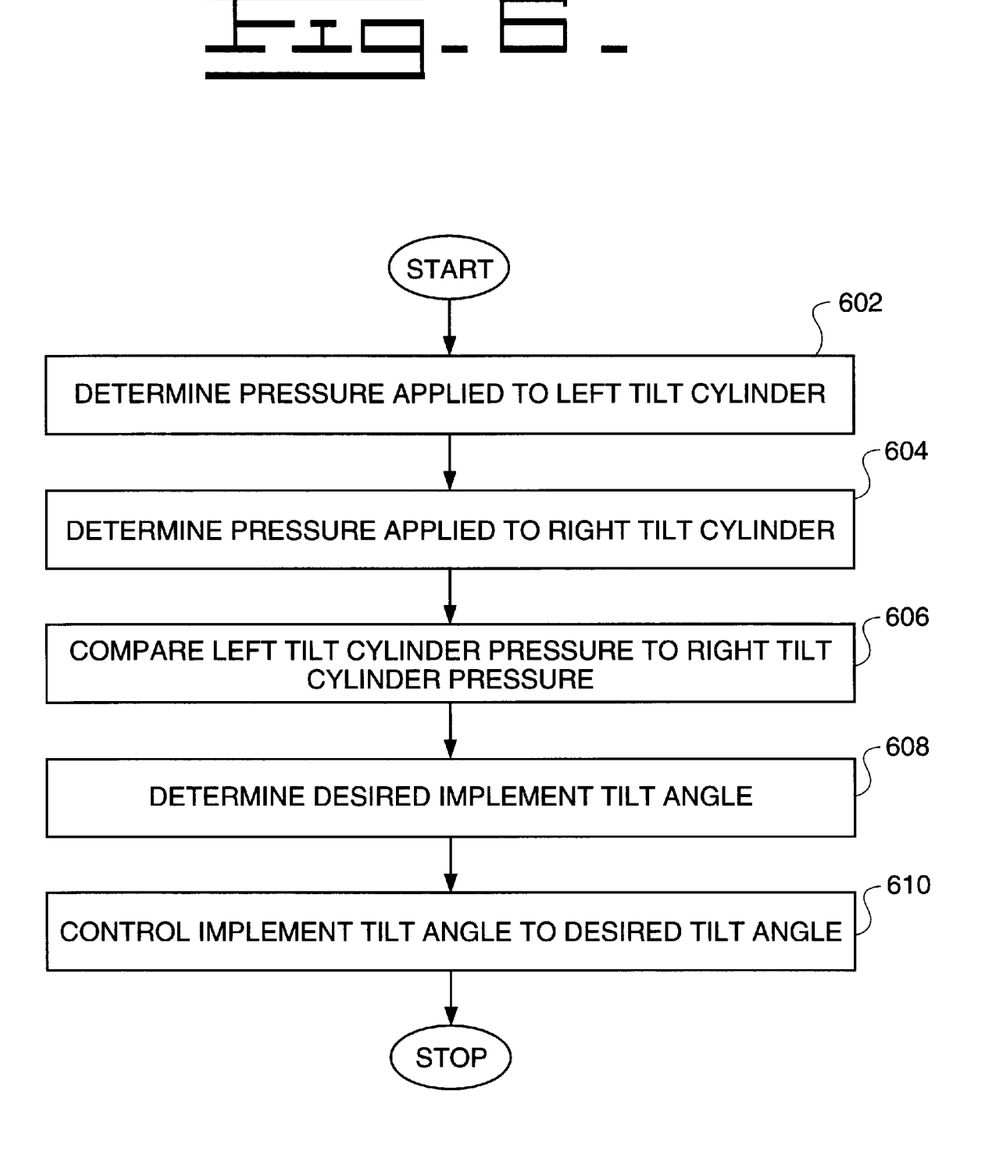
FIG. 6 is a flow diagram illustrating another aspect of the present invention.

Referring now to FIG. 6, a flow diagram illustrating an alternate embodiment of the present invention is shown.

In a first control block 602, the pressure applied to the left tilt cylinder 108 is determined. In a second control block 604, the pressure applied to the right tilt cylinder 108 is determined. In a third control block 606, the left and right tilt cylinder pressures are compared.

In a fourth control block 608, a desired implement tilt angle is determined as a function of a difference in pressure between the left and right tilt cylinders 108. Control then proceeds to a fifth control block 610, where the tilt angle of the implement 104 is controlled to the desired tilt angle to steer the machine 102 along the desired straight line path.

Industrial Applicability

Figure 7:
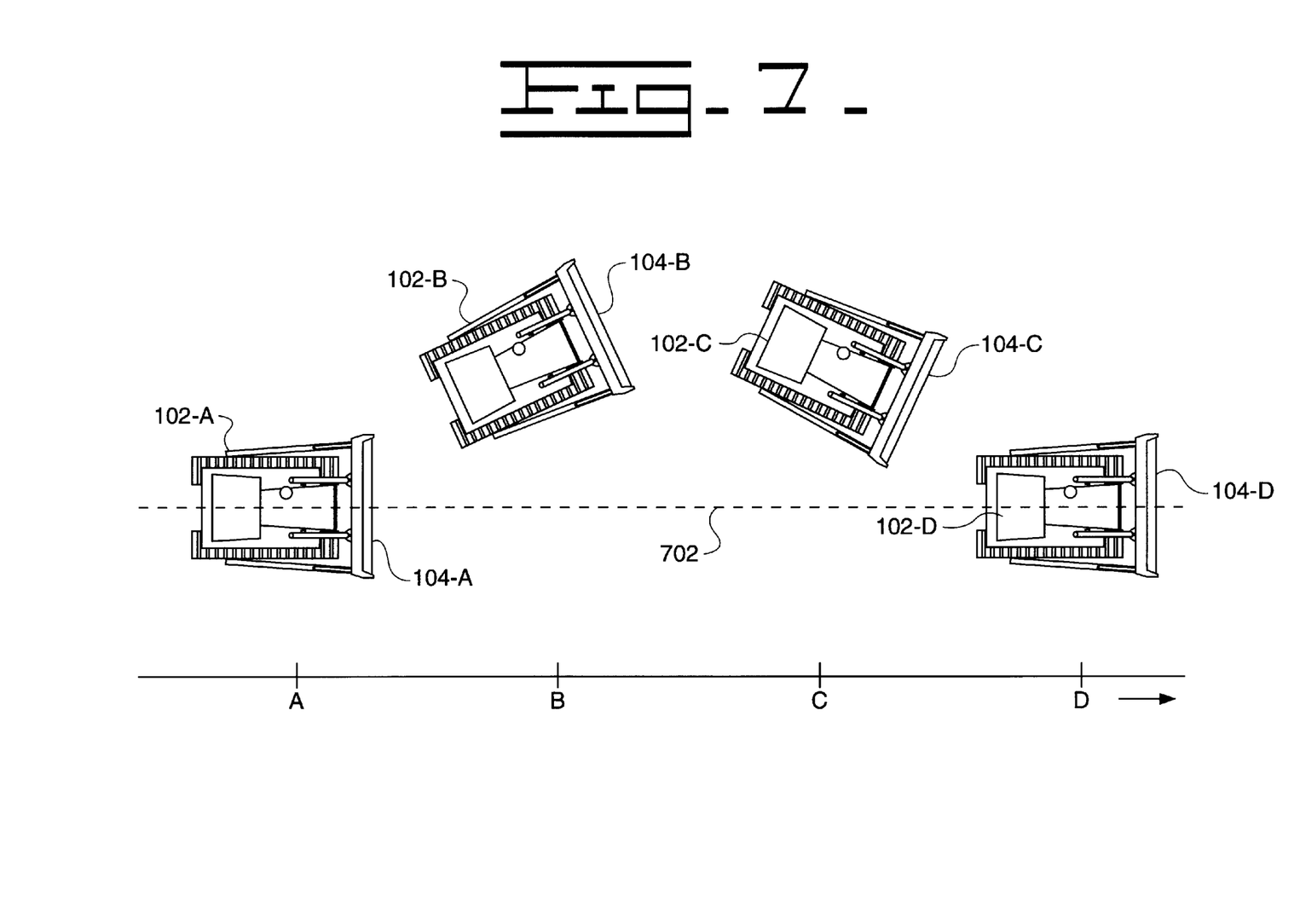
FIG. 7 is a diagrammatic illustration of an application of the present invention.

As an example of an application of the present invention, FIG. 7 shows a desired straight line path 702, on which an earthworking machine 102 intends to traverse. The earthworking machine 102 is shown at a start position at position A. At this first position, the machine 102 is on the straight line path 702, and the heading of the machine 102 is oriented so that forward movement of the machine 102 would cause the machine 102 to travel along the straight line path 702.

However, at position B, it is noted that the machine 102 has deviated to the left of the straight line path 702, and would continue to travel at the undesired heading if allowed to do so. It should be mentioned that the positions shown of the machine 102 in FIG. 7 are not drawn to any scale, and in fact are exaggerated for clarity of illustration. In the preferred embodiment, it might be desired to compensate for deviations in heading at no more than on half degree in error. This compensation would cause the earthworking machine 102 to essentially remain on the desired straight line path 702.

At position C, it is noted that the machine 102 has begun the process of correcting for the deviation in heading from the straight line path 702, and is returning to the straight line path 702. Preferably, this compensation is achieved by lowering the right end of the implement 104 into the earth, preferably by no more than five degrees of blade tilt, to cause the machine 102 to pivot slightly about the lowered portion of the implement 104, and change direction of travel to the right.

It is noted that, at position D, the machine 102 is back on the desired straight line path 702 at a heading which will cause the machine 102 to continue along the straight line path 702 until some force causes the machine 102 once again to deviate from the desired heading. The transition from position C to position D would likely require additional blade tilt commands to incrementally cause the machine 102 to move back to the desired heading. For example, the left end of the implement 104 would likely need to be tilted into the earth to re-compensate for the initial compensation at position C, and shift the heading of the machine 102 to the left for a net result that the machine 102 is eventually at the desired heading.

Other aspects, objects, and features of the present invention can be obtained from a study of the drawings, the disclosure, and the appended claims.

We claim:

1. A method for controlling a direction of travel of an earthworking machine having an earthworking implement, including the steps of:

determining a desired heading of the machine;
   determining an actual heading of the machine using a machine position determining system;
   determining a straight line path for the machine in site coordinates as a function of the desired heading;
   determining a deviation of the actual heading from the desired heading;
   determining a desired tilt angle of the implement as a function of the deviation; and
   controlling the tilt angle of the implement to the desired tilt angle and responsively steering the machine on the straight line path coordinates.

2. A method, as set forth in claim 1, wherein determining a deviation of the actual heading from the desired heading includes the step of determining the position of the earthworking machine as deviating from the straight line path coordinates.

3. A method, as set forth in claim 1, wherein the tilt angle of the implement is determined by detecting the position of each of a set of implement lift cylinders and responsively calculating the tilt angle.

4. A method, as set forth in claim 1, wherein the tilt angle of the implement is determined by detecting the position of each of a set of implement tilt cylinders and responsively calculating the tilt angle.

5. A method, as set forth in claim 1, further including the steps of:

determining a pressure applied to each of a left tilt cylinder and a right tilt cylinder;
   comparing the left tilt cylinder pressure and the right tilt cylinder pressure;
   determining a desired tilt angle of the implement as a function of a difference in pressure between the right tilt cylinder and the left tilt cylinder; and
   controlling the tilt angle of the implement to the desired tilt angle.

6. An apparatus for controlling a direction of travel of an earthworking machine having an earthworking implement, comprising:

a machine position determining system located on the earthworking machine;
   a heading controller located on the earthworking machine for receiving machine position information from the machine position determining system, determining a straight line path for the machine in site coordinates as a function of the machine position information, determining a deviation of an actual heading of the machine from a desired heading, and determining a desired tilt angle of the implement as a function of the deviation; and
   a tilt controller located on the earthworking machine for receiving the desired tilt angle from the heading controller and responsively controlling the tilt angle of the implement to the desired tilt angle.

7. An apparatus, as set forth in claim 6, wherein the machine position determining system is a global position satellite (GPS) system.

8. An apparatus, as set forth in claim 7, wherein the GPS system is adapted to determine a position and a heading of the earthworking machine.

9. An apparatus, as set forth in claim 6, wherein the heading controller is a PID controller.

10. An apparatus, as set forth in claim 6, wherein the heading controller is a fuzzy logic controller.

11. An apparatus, as set forth in claim 6, further including a cylinder position sensor located on each of a plurality of implement lift cylinders, wherein the tilt controller is adapted to monitor an actual tilt angle as a function of the cylinder position sensors.

12. An apparatus, as set forth in claim 11, wherein the tilt controller is further adapted to compare the actual tilt angle to the desired tilt angle and responsively control the tilt angle of the implement to the desired tilt angle.

13. An apparatus, as set forth in claim 6, further including a cylinder position sensor located on each of a plurality of implement tilt cylinders, wherein the tilt controller is adapted to monitor an actual tilt angle as a function of the cylinder position sensors.

14. An apparatus, as set forth in claim 13, wherein the tilt controller is further adapted to compare the actual tilt angle to the desired tilt angle and responsively control the tilt angle of the implement to the desired tilt angle.

15. An apparatus, as set forth in claim 6, further including:
- a left tilt cylinder pressure sensor located on the left tilt cylinder;
- a right tilt cylinder pressure sensor located on the right tilt cylinder; and
- a timer located in the heading controller;
- wherein the heading controller is adapted to compare the left tilt cylinder pressure, and the right tilt cylinder pressure at predetermined sampling time intervals, and responsively deliver a desired tilt angle signal to the tilt controller as a function of a difference between the left tilt cylinder pressure and the right tilt cylinder pressure.

16. An apparatus, as set forth in claim 15, wherein the tilt controller is adapted to control the tilt angle of the implement in response to receiving the desired tilt angle signal.

17. An apparatus, as set forth in claim 16, wherein the tilt controller is adapted to control the tilt angle of the implement during a time interval substantially less than the predetermined sampling time intervals.

18. An apparatus for controlling a direction of travel of an earthworking machine having an earthworking implement, comprising:
- means for determining a desired heading of the machine;
- means for determining an actual heading of the machine;
- means for determining a straight line path for the machine in site coordinates as a function of the desired heading;
- means for determining a deviation of the actual heading from the desired heading;
- means for determining a desired tilt angle of the implement as a function of the deviation; and
- means for controlling the tilt angle of the implement to the desired tilt angle and responsively steering the machine on the straight line path coordinates.

19. An apparatus, as set forth in claim 18, further including means for detecting the position of each of a set of implement lift cylinders and responsively calculating the tilt angle.

20. An apparatus, as set forth in claim 18, further including means for detecting the position of each of a set of implement tilt cylinders and responsively calculating the tilt angle.

21. An apparatus, as set forth in claim 18, further including:
- means for determining a pressure applied to each of a left tilt cylinder and a right tilt cylinder;
- means for comparing the left tilt cylinder pressure and the right tilt cylinder pressure;
- means for determining a desired tilt angle of the implement as a function of a difference in pressure between the right tilt cylinder and the left tilt cylinder; and
- means for controlling the tilt angle of the implement to the desired tilt angle.

* * * * *